US012712933B2

(12) United States Patent
Hiraoka et al.

(10) Patent No.: US 12,712,933 B2
(45) Date of Patent: Aug. 18, 2026

(54) PUSH-TO-TALK COMMUNICATIONS USING A WEB APPLICATION

(71) Applicant: Science Arts, Inc., Tokyo (JP)

(72) Inventors: Hidekazu Hiraoka, Tokyo (JP); Kazuaki Okimoto, Tokyo (JP); Daiki Higuchi, Tokyo (JP); Shungo Nakanishi, Tokyo (JP)

(73) Assignee: Science Arts, Inc., Tokyo (JP)

( * ) Notice: Subject to any disclaimer, the term of this patent is extended or adjusted under 35 U.S.C. 154(b) by 56 days.

(21) Appl. No.: 18/931,261

(22) Filed: Oct. 30, 2024

(65) Prior Publication Data

US 2025/0055895 A1 Feb. 13, 2025

Related U.S. Application Data

(63) Continuation of application No. PCT/JP2024/006635, filed on Feb. 22, 2024.

(30) Foreign Application Priority Data

Jun. 27, 2023 (JP) ................................ 2023-105200

(51) Int. Cl.
*H04L 65/4061* (2022.01)

(52) U.S. Cl.
CPC ................................ *H04L 65/4061* (2013.01)

(58) Field of Classification Search
CPC .................................................. H04L 65/4061

(Continued)

(56) References Cited

U.S. PATENT DOCUMENTS 9,615,218 B2 * 4/2017 Mazzarella ........... H04W 4/021
2011/0210171 A1 * 9/2011 Brown .................. H04L 63/083
235/382

(Continued)

FOREIGN PATENT DOCUMENTS

JP 2008-219297 A 9/2008
JP 2016-110607 A 6/2016

(Continued)

OTHER PUBLICATIONS

International Search Report for corresponding International Patent Application No. PCT/JP2024/006635 dated Mar. 26, 2024, with English translation (4 Pages).

(Continued)

*Primary Examiner* — David P Zarka
(74) *Attorney, Agent, or Firm* — Harness, Dickey & Pierce, P.L.C.

(57) ABSTRACT

According to the present embodiment, an information processing apparatus realizes Push-to-Talk communications using a Web application. The information processing apparatus includes an obtaining unit, a setting unit, and a communication controlling unit. The obtaining unit obtains, from a terminal, authentication information including a URL for accessing the Web application, location information of the terminal, and an IP address of an access point accessed by the terminal. The setting unit sets the terminal to be capable of performing the Push-to-Talk communications via the Web application if the authentication information is determined to be valid in an authentication process of the authentication information. The communication control unit determines, for the terminal set to be capable of executing the Push-to-Talk communications, whether or not the Push-to-Talk communications are permissible based on the authentication process of the authentication information.

15 Claims, 10 Drawing Sheets

(58) Field of Classification Search
USPC .......................................................... 709/227
See application file for complete search history.

(56) References Cited

U.S. PATENT DOCUMENTS

| | | | | |
|---|---|---|---|---|
| 2012/0134352 | A1* | 5/2012 | Vu | H04L 61/5053 370/347 |
| 2014/0098739 | A1* | 4/2014 | Luyks | H04W 48/20 370/316 |
| 2014/0156319 | A1* | 6/2014 | Deeb | G06Q 30/06 705/347 |
| 2015/0178784 | A1* | 6/2015 | Oliver | G06Q 30/0267 705/14.64 |
| 2015/0181080 | A1* | 6/2015 | Nuggehalli | H04N 1/4426 358/1.15 |
| 2016/0241660 | A1* | 8/2016 | Nhu | H04W 4/80 |
| 2018/0082054 | A1* | 3/2018 | Khwaja | H04L 67/02 |
| 2019/0124401 | A1* | 4/2019 | Lentner | H04N 21/2223 |
| 2020/0286169 | A1* | 9/2020 | Pinizzotto | H04L 63/1433 |
| 2021/0312576 | A1* | 10/2021 | Clarke | G06Q 20/202 |
| 2022/0398289 | A1* | 12/2022 | Armstrong | G06F 16/9558 |
| 2023/0344931 | A1* | 10/2023 | Church | G06Q 50/12 |

FOREIGN PATENT DOCUMENTS

| | | | | |
|---|---|---|---|---|
| JP | 2018-151912 | A | | 9/2018 |
| JP | 2023072529 | A | * | 5/2023 |

OTHER PUBLICATIONS

International Preliminary Report on Patentability for corresponding International Patent Application No. PCT/JP2024/006635 dated Dec. 23, 2025, with English translation (8 Pages).

* cited by examiner

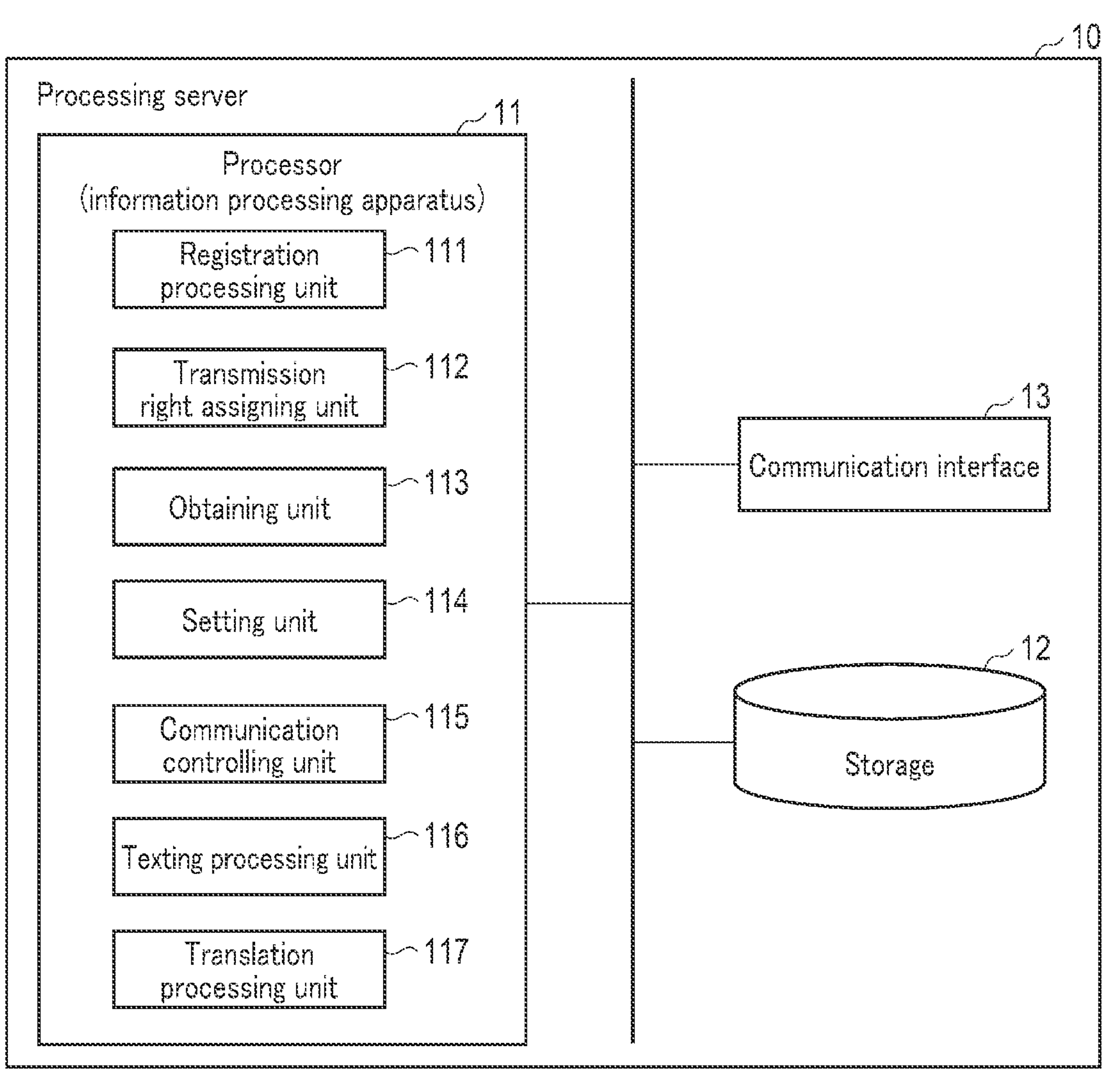
F I G. 2

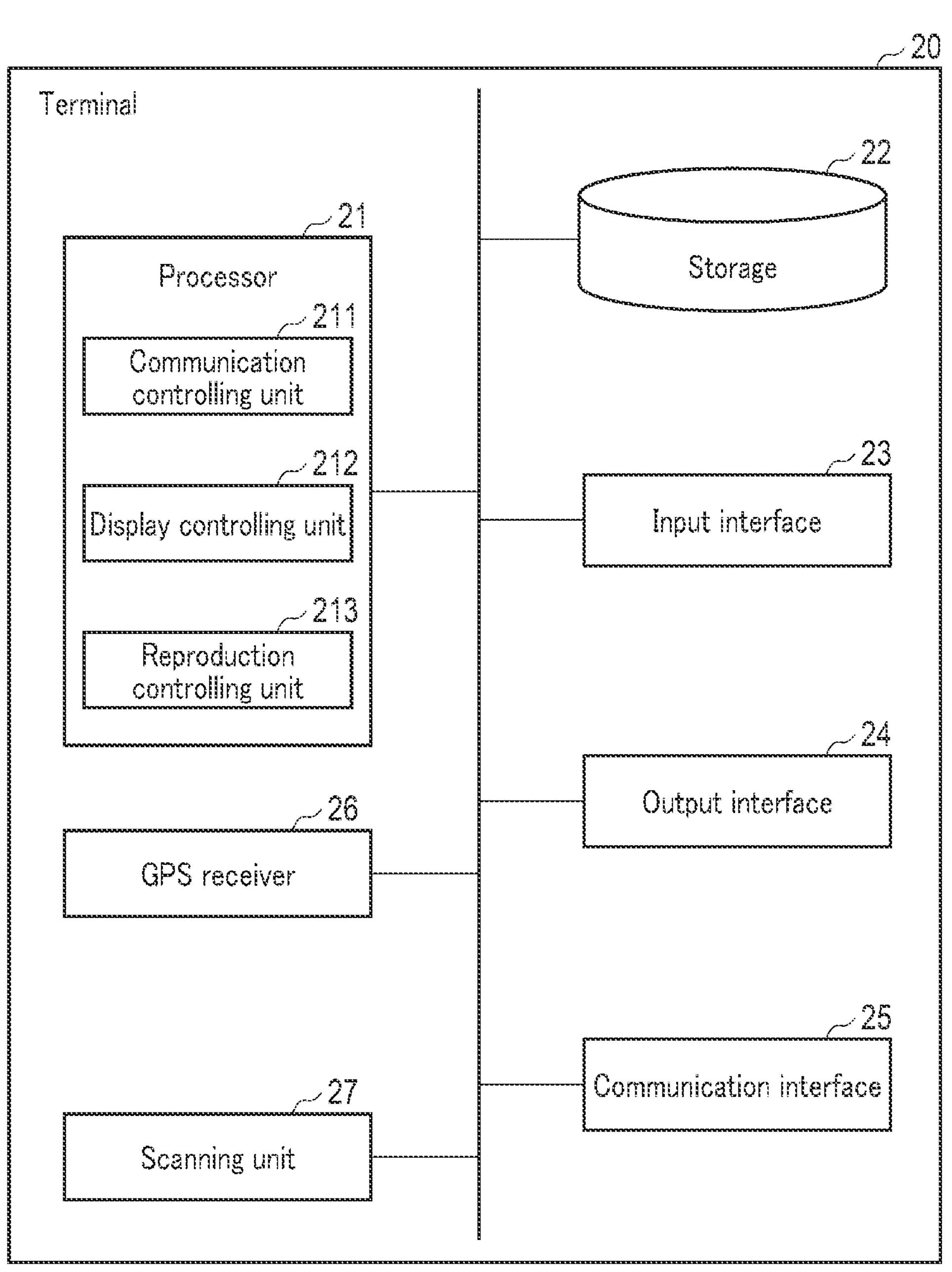
F I G. 3

50

| User ID | Terminal location information | IP address |
|---|---|---|
| User01 | Location information 01_12:00:00 | IP address 01 |
| | Location information 01_12:02:00 | IP address 01 |
| | ... | ... |
| User02 | Location information 02_12:00:00 | IP address 02 |
| | Location information 02_12:02:00 | IP address 02 |
| | ... | ... |
| ... | ... | ... |

F I G. 5

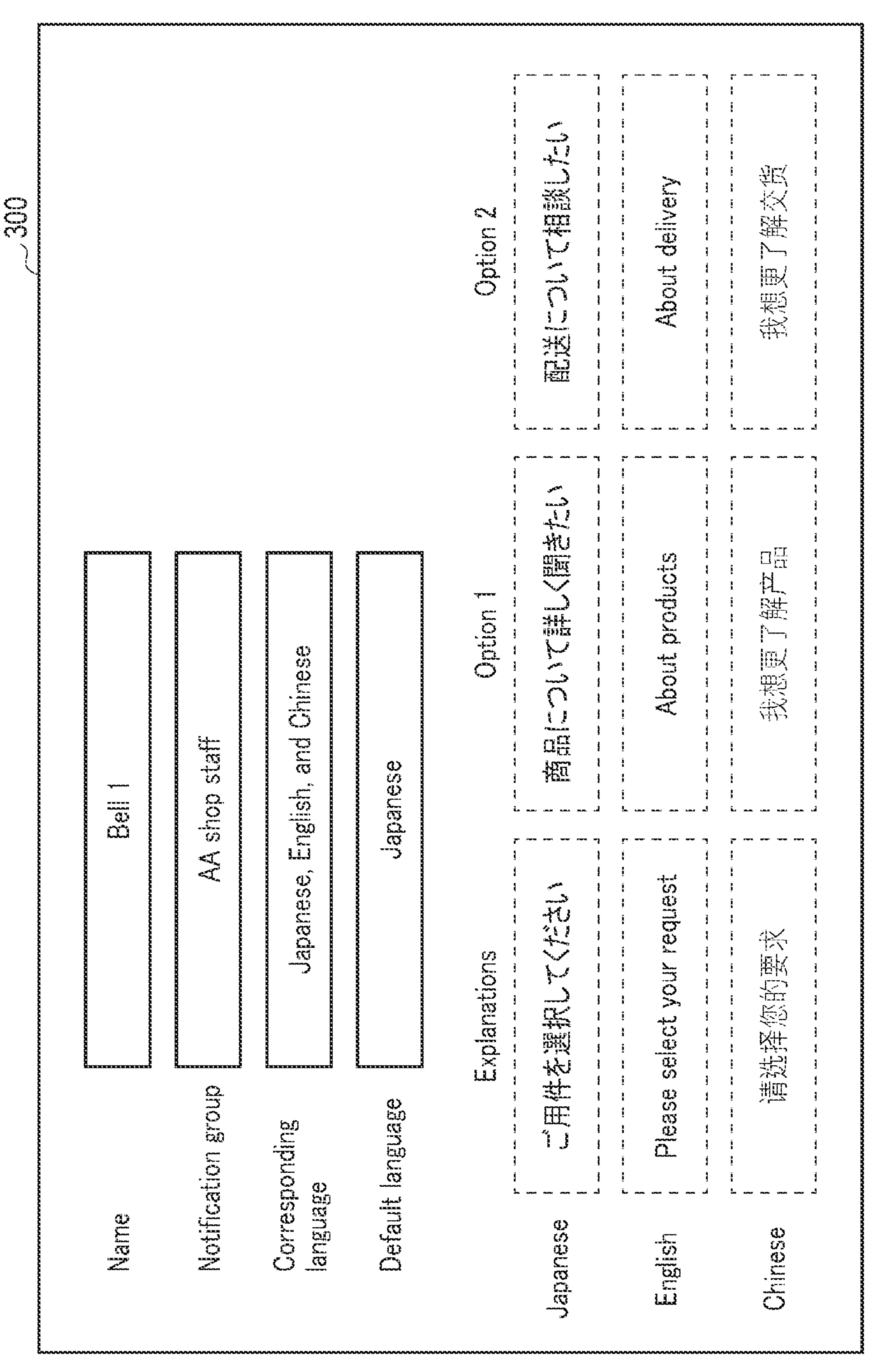
F I G. 10

PUSH-TO-TALK COMMUNICATIONS USING A WEB APPLICATION

CROSS-REFERENCE TO RELATED APPLICATION

This application is a Continuation Application of PCT Application No. PCT/JP2024/006635, filed Feb. 22, 2024 and based upon and claiming the benefit of priority from prior Japanese Patent Application No. 2023-105200, filed Jun. 27, 2023, the entire contents of all of which are incorporated herein by reference.

FIELD

The present invention relates to an information processing apparatus, an information processing method, and an information processing program.

BACKGROUND

Push-to-Talk (PTT) communication, which is a half-duplex speech communication system, is known as a technique realizing one-to-many simultaneous group speech communications. The recent spread of multipurpose terminals such as smartphones has attracted attention to Push-to-Talk over Cellular (PoC) that stipulates transmission of packets including speech data to multiple devices in a multicast manner. According to PoC, a transmission right for transmitting speech data is given to one of multiple terminals forming a talk group. The terminal that has acquired the transmission right transmits speech data to the other terminals in a multicast manner.

To establish PTT communications, an application for performing PTT is installed in advance on a terminal such as a smartphone. Thereafter, the installed application is activated, and a user ID and a password are input to the application to perform authentication, thus allowing the user to perform PTT communications using the assigned user ID.

However, in order for the user to use the above-described application to perform PTT communications, installment of the application on a smartphone and authentication through input of the assigned user ID may be burdensome to the user, depending on the situation. For example, in a situation where PTT communication needs to be performed only once and is no longer necessary, or it is desired to perform PTT communication immediately, the need to install the application and to use the assigned user ID to access the application may be inconvenient to the user. This can form a barrier for an unspecified number of users to easily use PTT communications.

SUMMARY

An information processing apparatus according to the present invention realizes Push-to-Talk communications using a Web application. The information processing apparatus includes an obtaining unit, a setting unit, and a communication controlling unit. The obtaining unit obtains, from a terminal, authentication information including a URL for accessing the Web application, location information of the terminal, and an IP address of an access point accessed by the terminal. The setting unit sets the terminal to be capable of performing the Push-to-Talk communications via the Web application if the authentication information is determined to be valid in an authentication process of the authentication information. The communication control unit determines, for the terminal set to be capable of executing the Push-to-Talk communications, whether or not the Push-to-Talk communications are permissible based on the authentication process of the authentication information.

BRIEF DESCRIPTION OF THE DRAWINGS

FIG. 2 is a block diagram showing a functional configuration of a processing server according to the present embodiment.

FIG. 3 is a block diagram showing a functional configuration of a terminal according to the present embodiment.

FIG. 5 is a diagram showing an example of a user management table according to the present embodiment.

FIG. 10 is a diagram showing an example of a call bell editing function.

DETAILED DESCRIPTION

Figure 1:
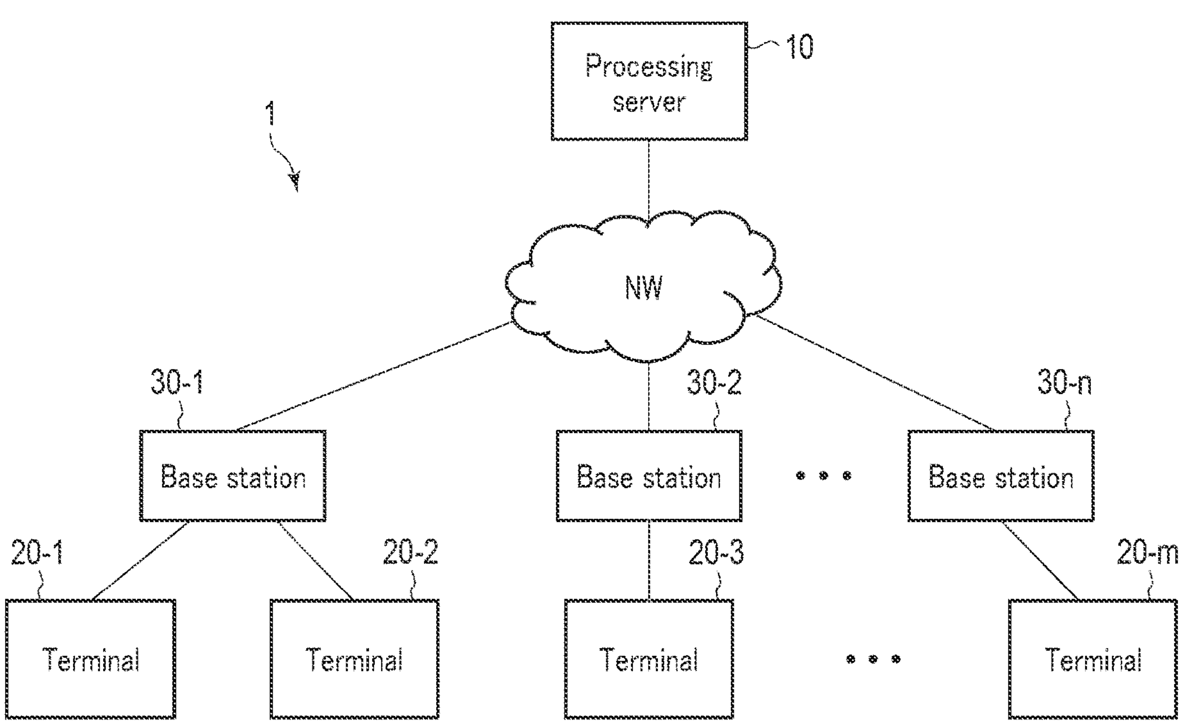
FIG. 1 is a block diagram showing a functional configuration of a communication system according to the present embodiment.

FIG. 1 is a block diagram showing an example of a functional configuration of a communication system 1 according to the present embodiment. The communication system 1 shown in FIG. 1 realizes one-to-many speech communications in units of groups using, for example, Push-to-Talk over Cellular (PoC) communications. The communication system 1 shown in FIG. 1 includes, for example, a processing server 10, terminals 20-1 to **20-*m*, and base stations 30-1 to 30-*n*. Each of n and m is a natural number equal to or greater than two. Each of the terminals 20-1 to 20-*m* and the base stations 30-1 to 30-*n* will be simply referred to as a "terminal 20" and a "base station 30**", respectively, if they are not particularly distinguished from one another.

The processing server 10 is connected to the base stations 30-1 to **30-*n* via a network such as the Internet, a communication network furnished by a communication carrier, and so on. The terminals 20-1 to 20-*m* are each adapted for wireless connection to any of the base stations 30-1 to 30-*n*** that forms a wireless area covering a current location of the terminal.

The processing server 10 may be, for example, an information processing apparatus adapted to implement Push-to-Talk communications (hereinafter, "PTT communications"), namely, control for transmitting, in a multicast manner, speech data or video data from any of the terminals 20-1 to **20-*m* that possesses a transmission right to another one or more of the terminals 20 held by users participating in the same talk group as the user of the originating terminal. In the present embodiment, it is assumed that the "transmission right" refers to a right by which speech data or video data transmissions in the context of POC are permitted. In the present embodiment, it is assumed that PTT communications are realized by the processing server 10 providing an application (hereinafter referred to as a "Web application") to allow each terminal 20 to access and use the Web application, without the Web application being installed on each terminal 20**.

The terminals 20-1 to 20-*m* may be terminals held by respective users, and each may be, for example, a cellular phone, a smartphone, a tablet PC, a given special terminal device, or the like. The terminals 20-1 to 20-*m* are adapted to conduct one-to-many speech communications under the PoC via the processing server 10. In an exemplary instance, the terminals 20-1 to 20-*m* each participate in a talk group according to a user operation. One of the terminals 20-1 to 20-*m* acquires the transmission right, following a user operation. The terminal 20 having acquired the transmission right accepts speech inputs from its user, and transmits the speech data based on the accepted speech to other terminals 20 participating in the same talk group via the processing server 10. Also, the terminals 20-1 to 20-*m* are adapted to receive text data generated at the processing server 10 based on the speech, and display characters corresponding to the text data on their displays.

The base stations 30-1 to 30-*n* are provided for respective areas of a predetermined size, and are each adapted to form a predetermined wireless area. The base stations 30-1 to 30-*n* are each adapted to be wirelessly connected to one or more of the terminals 20-1 to 20-*m*, which are located within the wireless area formed by itself.

Next, an example of a functional configuration of the processing server 10 will be described with reference to the block diagram of FIG. 2.

As shown in FIG. 2, the processing server 10 includes, for example, a processor 11, a storage 12, and a communication interface 13. The processor 11, the storage 12, and the communication interface 13 are connected together via, for example, a bus so that they can communicate with each other. The processor 11 will also be referred to as an "information processing apparatus".

The processor 11 is, for example, a central processing unit (CPU). In an exemplary operation, the CPU loads and runs application programs stored in the storage 12. The processor 11 thus realizes various functions corresponding to the application programs.

The storage 12 is a so-called auxiliary storage device, and may include a hard disk drive (HDD), non-volatile storage circuitry, e.g., a solid-state drive (SSD), etc., for storing various types of information. Note that the storage 12 may also be a drive device, etc., adapted to read and write various information sets from and to portable storage media such as a CD-ROM, a DVD, and a flash memory. The storage 12 stores application programs according to the present embodiment.

The storage 12 is adapted to store user information for users participating in talk groups, under the control of the processor 11. The storage 12 is also adapted to store call data generated based on speech data transmitted from a terminal 20 having the transmission right, text data obtained by subjecting the call data to texting processing, and video data obtained by the terminal 20, under the control of the processor 11. The storage 12 is further adapted to store translated text data obtained by subjecting the text data to translation processing, under the control of the processor 11. The storage 12 stores, in a group management table, a correspondence relationship between one or more talk groups and one or more group location information items respectively defining the one or more talk groups. Also, the storage 12 stores, in a user management table, a correspondence relationship between users participating in talk groups and the talk groups in which the users participate.

The communication interface 13 is circuitry for connection to the network. The communication interface 13 is adapted to transmit, via the network, data to at least one of the terminals 20-1 to 20-*m* each wirelessly connected to a corresponding one of the base stations 30-1 to 30-*n*. Also, the communication interface 13 is adapted to receive, via the network, data transmitted from at least one of the terminals 20-1 to 20-*m* each wirelessly connected to a corresponding one of the base stations 30-1 to 30-*n*.

The processor 11 shown in FIG. 2 runs the application programs stored in the storage 12 to realize functions of a Web application corresponding to the application programs. For example, by running the application programs, the processor 11 realizes functions to serve as a registration processing unit 111, a transmission right assigning unit 112, an obtaining unit 113, a setting unit 114, a communication controlling unit 115, a texting processing unit 116, and a translation processing unit 117.

The processor 11 shown in FIG. 2 may be constituted by a combination of multiple CPUs. That is, the registration processing unit 111, the transmission right assigning unit 112, the obtaining unit 113, the setting unit 114, the communication controlling unit 115, the texting processing unit 116, and the translation processing unit 117 shown in FIG. 2 may be realized by, for example, the respective CPUs running the corresponding application programs.

The processor 11 may also be constituted by special hardware components having the respective functions of the registration processing unit 111, the transmission right assigning unit 112, the obtaining unit 113, the setting unit 114, the communication controlling unit 115, the texting processing unit 116, and the translation processing unit 117. Moreover, the processor 11 may be constituted by an application-specific integrated circuit (ASIC), a field programmable gate array (FPGA), other complex programmable logic device (CPLD), or a simple programmable logic device (SPLD), which incorporates dedicated hardware circuits having the respective functions of the registration processing unit 111, the transmission right assigning unit 112, the obtaining unit 113, the setting unit 114, the communication controlling unit 115, the texting processing unit 116, and the translation processing unit 117.

The registration processing unit 111 is adapted to register users participating in talk groups for conducting one-to-many speech communications. More specifically, and for example, the registration processing unit 111 acquires user information about users participating in a given talk group, based on a request from the terminals 20-1 to 20-*m*. The registration processing unit 111 stores the acquired user information in the storage 12, in association with the talk group intended for participation.

The user information may include, for example, an ID of a talk group, an ID of a user participating in the talk group, an IP address of a terminal held by the user, a language code of a language set by the user, a login state of the user, location information of the terminal, and so on. The registration processing unit 111 stores, in the storage 12, definition information indicative of which user participates in which talk group, that is, IDs of talk groups and IDs of users participating in the respective talk groups, for example. Also, the registration processing unit 111 stores, in the storage 12, information that dynamically changes according to the states of the terminals 20, that is, IP addresses, language codes, login states, and location information, etc., for example.

The transmission right assigning unit 112 is adapted to assign a transmission right to one of the terminals held by users participating in a given talk group.

The obtaining unit 113 obtains authentication information about usage of the Web application from a terminal 20.

The setting unit 114 sets the terminal 20 that has transmitted the authentication information to be capable of executing PTT communications via the Web application.

The communication controlling unit 115 is adapted to control communications among terminals 20 held by users participating in a talk group, so that one-to-many speech communications are implemented. More specifically, in an exemplary instance, the communication controlling unit 115 transmits speech data or video data transmitted from a terminal 20 assigned with the transmission right to one or more terminals 20 held by users participating in the same talk group.

Also, the communication controlling unit 115 is adapted to control communications so that text data converted from speech data is transmitted to one or more terminals 20 held by users participating in a talk group. More specifically, in an exemplary instance, the communication controlling unit 115 transmits, upon conversion of speech data into text data, a notice indicative of the completion of the texting processing to one or more terminals 20 held by users participating in a talk group. Then, in response to the terminals 20 requesting transmission of the text data, the communication controlling unit 115 transmits the text data to the requestor terminals 20.

The communication controlling unit 115 is adapted to control communications so that translated text data, which is generated by translating text data into a given language, is transmitted to the terminals in need of the translation. More specifically, in an exemplary instance, the communication controlling unit 115 transmits, upon completion of translation of text data, a notice indicative of the completion of the translation processing to the terminals 20 held by users participating in a talk group. Then, in response to the terminals 20 requesting transmission of the translated text data, the communication controlling unit 115 transmits the translated text data to the requester terminals 20.

The texting processing unit 116 is adapted to convert speech data transmitted from the terminal with the transmission right into text data. More specifically, and for example, the texting processing unit 116 converts the speech data into text data based on grammar information, linguistic structure information, information about compositions of speech data, stored word information, and so on. Note that the speech-to-text data conversion processing adopted by the texting processing unit 116 may utilize the existing technology.

The translation processing unit 117 is adapted to perform translation processing on the text data obtained through the conversion processing by the texting processing unit 116, in order to generate translated text data. More specifically, and for example, the translation processing unit 117 translates the text data obtained through the conversion processing by the texting processing unit 116 into the text data in a language corresponding to the language code associated with the applicable user participating in a talk group. Note that the translation processing adopted by the texting processing unit 116 may utilize the existing technology, including statistical machine translation, neural machine translation, etc.

Note that the processing server 10 may include an unillustrated input interface. The input interface may be realized by, for example, a mouse, a keyboard, a touch pad which receives input instructions through contact with its operation screen, and so on. The input interface may convert input instructions from operators into electric signals, and output the electric signals to the processor 11. The input interface is not limited to physical operation devices such as a mouse, a keyboard, etc. Examples of the input interface may include a receive port adapted to accept electric signals from external input devices.

The processing server 10 may also include an unillustrated output interface. The output interface may be realized by, for example, a display device, a print device, and the like. As the display device, any display equipment may be employed, including a CRT display, a liquid crystal display, an organic EL display, an LED display, a plasma display, etc. The display device is adapted to display image data for display subjects. The print device is, for example, a printer. The print device is adapted to print out image data for print subjects in the form of a predetermined sheet. The output interface is not limited to physical output devices such as a display device, a print device, etc. Examples of the output interface may include an output port adapted to send out image data to an external output device.

FIG. 3 is a block diagram showing an example of a functional configuration of each of the terminals 20.

The terminal 20 shown in FIG. 3 includes, for example, a processor 21, a storage 22, an input interface 23, an output interface 24, a communication interface 25, a GPS receiver 26, and a scanning unit 27.

The processor 21 is, for example, a CPU. In an exemplary operation, the CPU loads application programs stored in the storage 22 into the RAM. The CPU runs the application programs loaded into the RAM. The processor 21 thus realizes various functions corresponding to the application programs.

The storage 22 is a so-called auxiliary storage device, and may include nonvolatile storage circuitry, e.g., a NAND or NOR flash memory, etc. Note that the storage 22 may also be a drive device, etc., adapted to read and write various information sets from and to portable storage media such as an SD card, a micro SD card, and so on. The storage 22 stores application programs related to the embodiments. The storage 22 also stores information for the talk groups available for its terminal to participate in.

The input interface 23 may be realized by buttons, a touch panel which receives input instructions through contact with its operation screen, a microphone for speech inputs, and so on. The input interface 23 is adapted to convert input instructions from an operator into electric signals, and output the electric signals to the processor 21.

The output interface 24 may be realized by, for example, a display device, a speaker, and so on. Examples of the display device include a liquid crystal display, an organic EL display, etc. The display device is adapted to display image data and video data for display subjects. The speaker is adapted to reproduce speech data involved in speech communications.

The communication interface 25 is circuitry for wireless communications with the base stations 30-1 to **30-*n*. The communication interface 25 may be realized by, for example, an antenna and a wireless equipment component. The antenna is adapted to receive incoming radio signals. Also, the antenna is adapted to transmit radio signals output from the wireless equipment component. The wireless equipment component is adapted to convert the radio signals received by the antenna with a preset demodulation scheme, and output the data after the conversion to the processor 21. The wireless equipment component is also adapted to convert the data generated at the processor 21** into radio signals with a preset modulation scheme, and output the radio signals after the conversion to the antenna.

The GPS receiver 26 is adapted to receive signals from GPS satellites, and generate terminal location information about the location of the terminal based on the received signals.

The scanning unit 27 is, for example, a camera installed on the terminal 20 or an infrared camera, and is configured to read a one-dimensional or two-dimensional code in which information about the Web application such as a uniform resource locator (URL) is embedded, to extract the information embedded in the code. Examples of the one-dimensional code include a barcode. Examples of the two-dimensional code include a QR code (registered trademark).

The processor 21 shown in FIG. 3 serves as a communication controlling unit 211, a display controlling unit 212, and a reproduction controlling unit 213.

The communication controlling unit 211 is adapted to control the communications with the processing server 10. More specifically, and for example, if a terminal 20 has gained the transmission right after accessing the Web application and being set to be capable of executing PTT communications, the communication controlling unit 211 converts speech input from the microphone in accordance with a TCP/IP-based unique protocol. The communication controlling unit 211 transmits the speech data after the conversion to the processing server 10, which executes the Web application, via the network NW and the corresponding base station 30. This allows the processing server 10 to obtain speech data from the terminal 20 on the Web application, and to generate text data corresponding to distribution of the speech data and text data corresponding to the speech data. By accessing the Web application provided by the processing server 10, the terminal 20 can display, on its display, etc., speech data and corresponding text data.

Also, in an exemplary instance, the communication controlling unit 211 of the terminal 20 without the transmission right can access the Web application provided by the processing server 10, and output speech data transmitted by the terminal 20 with the transmission right via the reproduction controlling unit 213. The communication controlling unit 211 accesses the Web application, and displays, on the display, text data obtained by converting speech data into text via the display controlling unit 212. Also, if the language set for a terminal 20 without the transmission right differs from the language set for a terminal 20 with the transmission right, the communication controlling unit 211 can access the Web application, and display, on the display, etc., translated text data obtained by the text data being translated into a desired language by the translation processing unit 117 of the processing server 10 via the display controlling unit 212.

The communication controlling unit 211 transmits terminal location information generated by the GPS receiver 26 to the processing server 10 at the timing of receiving a user instruction or periodically at predetermined intervals.

The display controlling unit 212 is adapted to control processing for display operations with the display as the output interface 24. More specifically, and for example, the display controlling unit 212 controls the display so that the display presents the received various notices, as well as the screen of the Web application and the received video data.

The reproduction controlling unit 213 is adapted to control reproduction of speech corresponding to the characters based on text data that are being displayed on the display. More specifically, and for example, the reproduction controlling unit 213 controls the speaker as the output interface 24 to reproduce the call data corresponding to the characters based on text data that are being displayed on the display. Also, the reproduction controlling unit 213 obtains video data, and causes the display to display the obtained video data.

The reproduction controlling unit 213 is also adapted to control recitation of characters based on translated text data. More specifically, and for example, if there is a recitation request for characters based on the translated text data being displayed on the display, the reproduction controlling unit 213 controls the speaker as the output interface 24 to reproduce the speech data corresponding to the translated text data. Note that the reproduction controlling unit 213 may be realized by, for example, an application program interface (API) provided by an operating system (OS).

Figure 4:
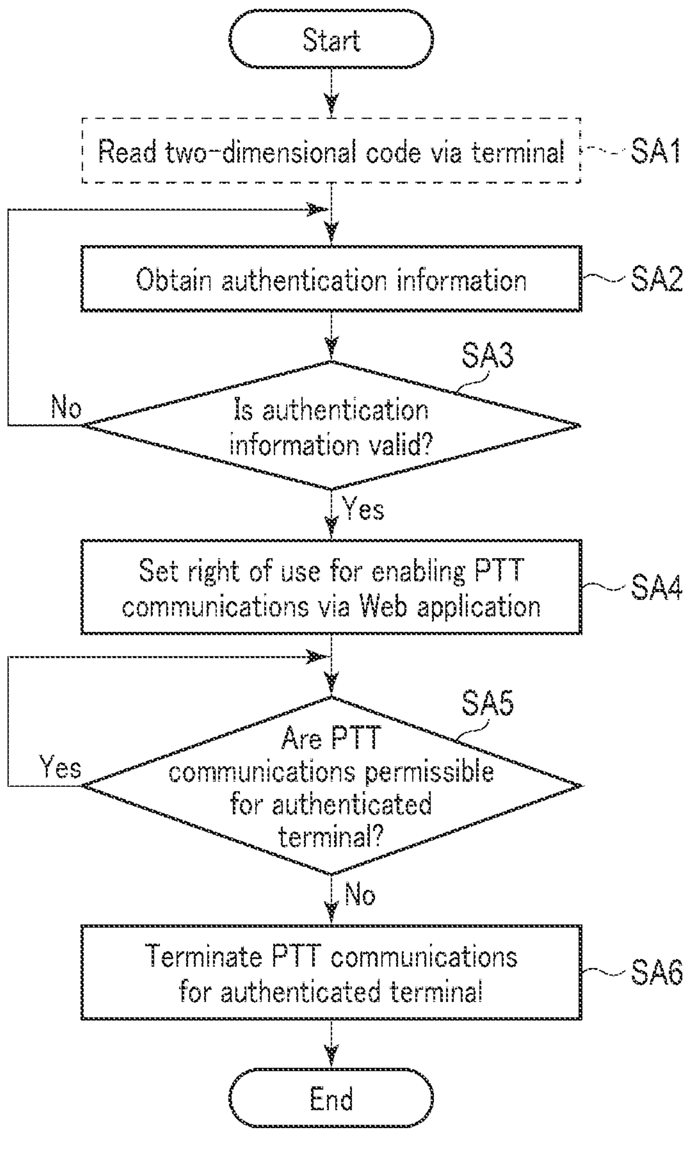
FIG. 4 is a flowchart illustrating an operation of a communication system according to the present embodiment.

Next, an operation example of the information processing apparatus according to the present embodiment will be described with reference to the flowchart of FIG. 4.

At step SA1, the user operates the terminal 20, and reads a two-dimensional code via the scanning unit 27. More specifically, and for example, the user reads a QR code using a camera, which is the scanning unit 27 of the terminal 20. Thereby, a URL, etc. for accessing the Web application embedded in the two-dimensional code can be acquired.

At step SA2, the terminal 20 accesses the Web application based on the read two-dimensional code, allowing the obtaining unit 113 of the processing server 10 to obtain authentication information from the terminal 20. The obtained authentication information is stored in, for example, the storage 12. Herein, the authentication information includes, as elements, at least one of a URL for accessing the Web application embedded in the two-dimensional code, terminal location information indicating the location of the terminal 20, and an IP address indicating a transmission source that has been assigned by an access point, etc. accessed by the terminal 20. The authentication information is not limited thereto, and may include other elements such as time information about the time of access, model information including the model of the terminal 20 and the type of the OS, and so on.

At step SA3, the setting unit 114 determines whether or not authentication information transmitted from the terminal 20 is valid. If, for example, the authentication information includes terminal location information, GPS information transmitted from the terminal 20 is referred to, and the authentication information is determined to be valid on the condition that the access is from a specific area on map coordinates, such as a shop, a school, etc.

Alternatively, if the authentication information includes an IP address, the IP address transmitted from the terminal 20 is referred to, and the authentication information is determined to be valid on the condition that the IP address is a predetermined address. Similarly, if the authentication information includes, as one of its elements, time information, the authentication information is determined to be valid on the condition that the time of use of the Web application by the terminal 20 is within a predetermined time interval. More than one element of the terminal location information, the IP address, and the time information may be determined to be valid; furthermore, the authentication information may be determined to be valid if all the combined elements satisfy certain conditions. That is, determination as to whether or not the authentication information is valid should be performed using at least one of the elements of the authentication information.

If the authentication information is determined to be valid, the processing advances to step SA4, and if the authentication information is determined to be invalid, an access from the terminal 20 is denied, and the processing returns to step SA2 where similar processing is repeated to obtain an access from another terminal 20 based on new authentication information.

At step SA4, the setting unit 114 sets the terminal 20 to be capable of executing PTT communications via the Web application. Specifically, a right of use for enabling PTT communications via the Web application is set in the terminal 20. The terminal 20 in which the right of use is set will also be referred to as an "authenticated terminal 20". The terminal 20 can be registered as, for example, a default user with the right of use who is capable of using PTT communications without individually setting the user ID and the password, instead of individual setting in which the PTT communications are performed using a user ID and a password that have been individually assigned. Thereby, an unspecified number of users can easily perform PTT communications, without the need to install applications for performing PTT communications.

At step SA5, the communication controlling unit 115 determines whether or not PTT communications are permissible for the terminal 20 authenticated at step SA4. If the terminal 20 accesses the Web application from a specific area determined at step SA3, it can be determined that PTT communications are impermissible for the terminal 20. Alternatively, if an access by the IP address of the terminal 20 is not via an access point in a specific area in which the PTT communications are permitted and the IP address is not a predetermined address, it can be determined that PTT communications are impermissible for the terminal 20. Alternatively, if the time of access by the terminal 20 is out of the predetermined time interval, it can be determined that the PTT communications are impermissible for the terminal 20, on the grounds that the access has been made during non-reception or out-of-response hours. If the PTT communications of the terminal 20 are determined to be impermissible, the processing advances to step SA6, and if the PTT communications of the terminal 20 are permissible, the determination processing at step SA5 is repeated at predetermined intervals while executing the PTT communications of the terminal 20. At step SA5, a determination process can be performed based on one or more elements based on which it has been determined at step SA3 whether or not the authentication information is valid.

At step SA6, the communication controlling unit 115 terminates the PTT communications for the authenticated terminal 20. If the PTT communications are determined to be impermissible at step SA5, the communication controlling unit 115 may transmit, to the terminal 20, a message prompting an access from a specific area and a specific access point, instead of promptly terminating the PTT communications. The communication controlling unit 115 may terminate the PTT communications even after a predetermined period of time has passed since the transmission of the message, if PTT communications are not performed from the specific area and if PTT communications are not performed from a specific access point.

Next, an example of a user management table according to the present embodiment will be described with reference to FIG. 5.

In the user management table 50 shown in FIG. 5, user IDs, terminal location information items, and IP addresses are associated with one another as authentication information. The user ID "User01" is associated with the terminal location information "terminal location information 01_12:00:00". For the terminal location information, GPS information (corresponding to the terminal location information 01) transmitted from the terminal 20 at predetermined intervals is associated with the time information and stored as time-series data. To save space in the storage area, the time-series data of the terminal location information may be deleted after a certain period of time has passed. Also, the "IP address01", which is the IP address of the originating terminal at the time of access to the Web application by the terminal 20, is associated in the above manner. As a matter of course, items contained in the information data transmitted from the terminal 20 may also be associated in the user management table.

Next, a usage example of the communication system according to the present embodiment will be described with reference to FIG. 6.

Figure 6:
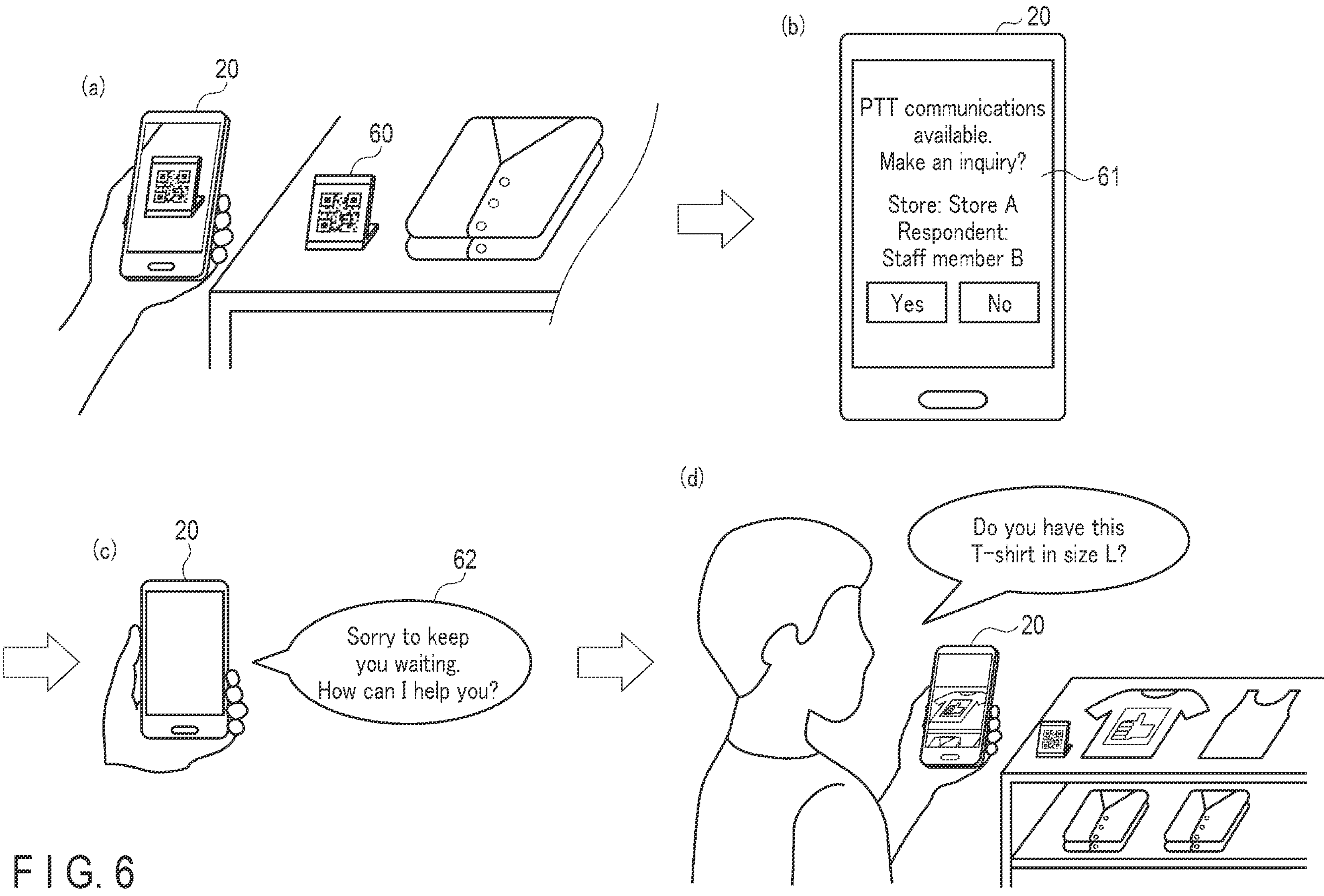
FIG. 6 is a diagram showing a usage example of the communication system according to the present embodiment.

FIG. 6 is a diagram showing a usage example of the communication system according to the present embodiment in an unmanned clothing store in which there is no staff.

FIG. 6(*a*) assumes a case where the user who is holding the terminal 20 has entered the unmanned store that sells clothing and is looking for clothes that suit the user's taste. The user activates the scanning unit 27 of the terminal 20 to read the two-dimensional code 60 placed on the shelf.

As shown in FIG. 6(*b*), the URL of the Web application obtained from the read two-dimensional code 60 is accessed. The terminal location information is transmitted to the processing server 10 as identification information from the terminal 20.

It is assumed herein that the authentication information contains terminal location information transmitted from the terminal 20 to the Web application. If the condition for the authentication information to be valid is that the access is from within the store, since the access has been made by reading the two-dimensional code in the store via the terminal 20, the setting unit 114 of the processing server 10 determines that the access from the terminal 20 has been made from within the store, and that the authentication information is determined to be valid by referring to the terminal location information. As an exemplary instance, a screen 61 indicating "PTT communications available. Make an inquiry? Store: Store A Respondent: Staff Member B" is displayed on the terminal 20. It is assumed that the user has selected "Yes".

In FIG. 6(*c*), the terminal 20 is enabled to perform PTT communications using the Web application. In the example of FIG. 6(*c*), the PTT-communication-based speech "Sorry to keep you waiting. How can I help you?" (text bubble 62) of the staff member B, who is the respondent, is output from the speaker of the terminal 20.

As shown in FIG. 6(*d*), the user photographs the clothing (a T-shirt in this case) that he or she wishes to inquire about with the camera of the terminal 20 and utters, "Do you have this T-shirt in size L?", and thereby speech data based on the PTT communications is transmitted to the Web application. Thereafter, the PTT communications between the user and the respondent can be continued in the same manner.

Next, a display example of text data about PTT communications shown in FIG. 6 will be described with reference to FIG. 7.

Figure 7:
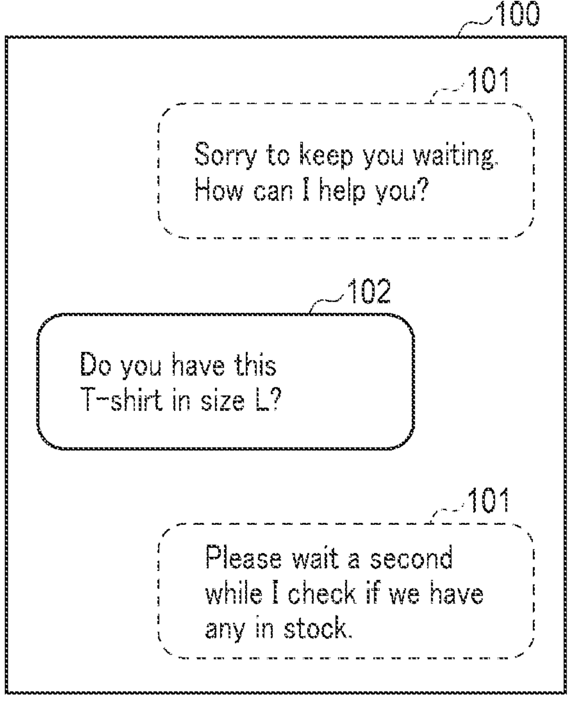
FIG. 7 is a diagram showing a display example of text data about PTT communications shown in FIG. 6.

FIG. 7 shows a text display screen 100 of a talk group on the Web application. The utterance of the respondent is indicated by a text 101 enclosed by the dashed line, and the utterance of the user is indicated by a text 102 enclosed by the solid line. The dashed line and the solid line need not necessarily be used, and any display format capable of uniquely distinguishing between the utterances of the participants in the talk group can be used. Alternatively, a display format capable of distinguishing between self and others may be used.

In addition, the terminal 20 may be configured to be capable of executing functions other than the PTT communication execution function after the two-dimensional code is read.

Another usage example of the communication system according to the present embodiment will be described with reference to FIG. 8.

Figure 8:
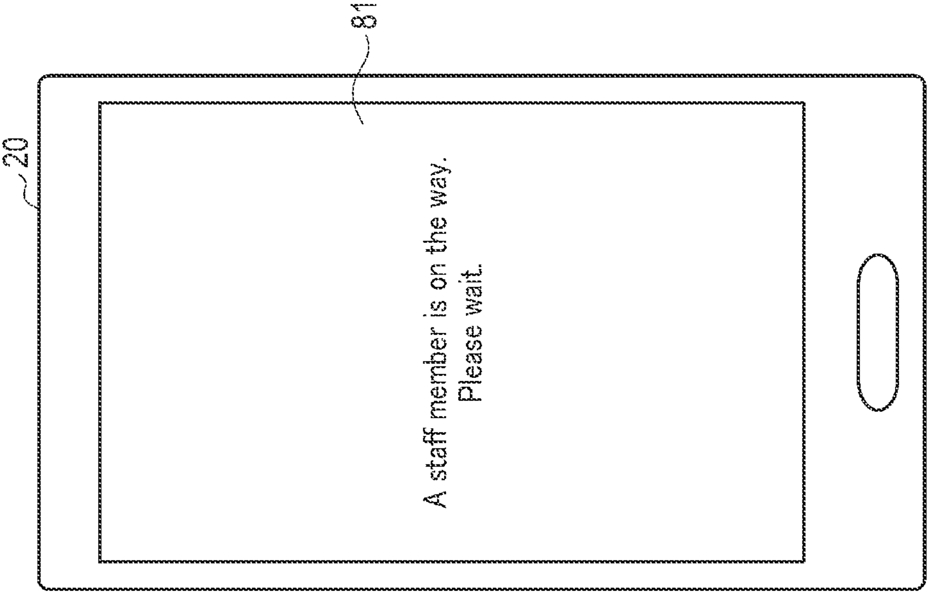
FIG. 8 is a diagram showing another usage example of the communication system according to the present embodiment.
Figure 8:
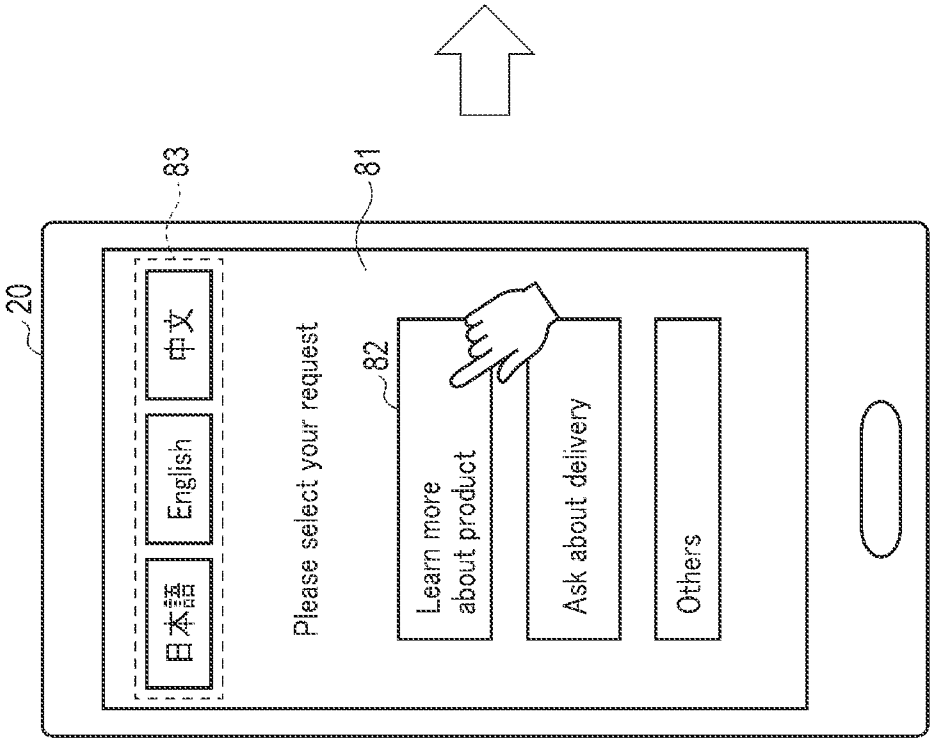

FIG. 8 shows an example in which the user executes a function corresponding to a call bell (hereinafter simply referred to as a "call bell") for calling the staff. FIG. 8 shows a display screen 81 of the terminal 20 in the state of, for example, FIG. 6(*b*) after reading of the two-dimensional code.

In this example, a plurality of buttons 82 for requests assumed to be asked to the staff are displayed on the display screen 81 of the terminal 20. Specifically, buttons 82 "Learn more about product", "Ask about delivery", and "Others" are displayed. In addition, a language switching button 83 for switching the content of display to multiple languages is displayed. For example, Japanese, English, and Chinese are prepared as languages to which the switching can be made, and the display can be switched to a desired language by tapping the language switching button 83.

The user taps a desired request. In the example of FIG. 8, it is assumed that the user has tapped the button indicating "Learn more about product". Thereafter, a text indicating that the staff is being called, such as "A staff member is on the way. Please wait.", is displayed on the display screen 81 of the terminal 20. This allows the user to read the two-dimensional code and to execute the call bell through tapping of the button. Through the tapping of the button 82 for the request, the staff can be informed of the corresponding request in advance, allowing for smooth communication after arrival of the staff member.

Figure 9:
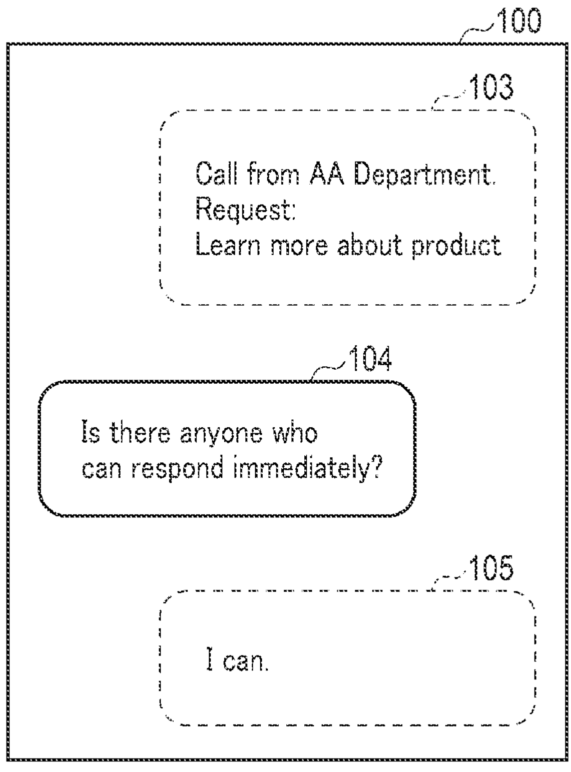
FIG. 9 is a diagram showing an example of a group chat display screen for staff upon execution of call bell by a user.

Next, a display screen of a group chat of the staff upon execution of a call bell by the user is shown in FIG. 9.

As shown in FIG. 8, if the user has tapped the button "Learn more about product", the group chat of the staff is notified of a chat message 103 indicating that a call has been made. As the chat message 103, a notification "Call from AA Department. Request: Learn more about product." is made. On the terminal 20 used by the staff, the reproduction controlling unit 213 may recite the chat message 103 through speech synthesis processing. Alternatively, synthetic speech data corresponding to the chat message 103 may be transmitted from the processing server 10, and the reproduction controlling unit 213 may reproduce the synthetic speech data.

In the example of FIG. 9, since a push notification indicating that there has been a call from the store is sent to the group chat, it is possible to make a suitable response to the call from the user, such as a chat message 104 "Is there anyone who can respond immediately?" and a chat message 105 "I can.".

Next, a call bell editing function will be described with reference to FIG. 10.

FIG. 10 is an example of a management table 300 in which the wording displayed on the call bell is set and edited. For example, the registration processing unit 111 in the processing server 10 reflects setting and editing of the management table 300 from the manager, and stores them in the storage 12.

The management table 300 includes "name" for management, "notification group" to be notified of a call by the call bell, a "corresponding language" indicating a corresponding language, a "default language" indicating a default language, and "explanations" and "options" for each language. Based on the user instruction, the registration processing unit 111 updates the contents of one or more options for the management table 300 by accepting a modification and an addition to the contents. In this manner, by editing the contents, in particular, the explanations and the options, the manager of the call bell can freely set the language, the contents to be displayed as a call bell in each language, and so on.

With the above-described information processing apparatus according to the present embodiment, if the authentication information transmitted from a terminal is determined to be valid, the terminal is set to be capable of performing Push-to-Talk communications via the Web application. By simply reading the code with a scanner of a terminal, PTT communications can be simply performed without the need to install the application for performing the PTT communications, and without the burden of eliminating the user ID/password setting processing. This allows an unspecified number of people to easily perform PTT communications on the spot for only a certain period of time, thus improving the service for users of the PTT communications.

In addition, by simply reading a code with a scanner of a terminal, contents of estimated inquiries are displayed on the screen of the terminal, and a push notification indicating a content of an inquiry specified by the user is sent to the group chat. It is thereby possible to realize a call bell capable of grasping the content of the user's inquiry in advance.

While certain embodiments of the invention have been described, they have been presented by way of example only, and they are not intended to limit the scope of the invention.

What is claimed is:

1. An information processing apparatus configured to realize Push-to-Talk communications using a Web application, the apparatus comprising a processor configured to:

obtain, from a terminal, authentication information including a uniform resource locator (URL) for accessing the Web application, location information of the terminal, and an internet protocol (IP) address of an access point accessed by the terminal;

set the terminal to be capable of performing the Push-to-Talk communications via the Web application if the authentication information is determined to be valid in an authentication process of the authentication information; and determine, for the terminal set to be capable of executing the Push-to-Talk communications, whether or not the Push-to-Talk communications are permissible based on the authentication process of the authentication information.

2. The information processing apparatus according to claim 1, wherein the processor sets the terminal to be capable of executing the Push-to-Talk communications via the Web application if the location information indicates a location within a predetermined range.

3. The information processing apparatus according to claim 1, wherein the processor sets the terminal to be capable of executing the Push-to-Talk communications via the Web application if the IP address is a predetermined address.

4. The information processing apparatus according to claim 1, wherein the authentication information is embedded in a one-dimensional code or a two-dimensional code.

5. The information processing apparatus according to claim 1, wherein the processor executes the Push-to-Talk communications with the terminal if the Push-to-Talk communications are determined to be permissible for the terminal.

6. The information processing apparatus according to claim 1, wherein the Web application causes the terminal to display a display screen for one or more options including a content of an inquiry from a user of the terminal, and the processor notifies, if information about one of the options specified by the user is obtained from the terminal, a talk group in the Push-to-Talk communications of a content corresponding to the specified option.

7. The information processing apparatus according to claim 1, wherein the Web application includes a display screen for one or more options including a content of an inquiry from a user of the terminal, and the processor is further configured to update the content of the one or more options being displayed on the display screen by accepting a modification and an addition to the content.

8. An information processing method for realizing Push-to-Talk communications using a Web application, the method comprising:

obtaining, from a terminal, authentication information including a uniform resource locator (URL) for accessing the Web application, location information of the terminal, and an internet protocol (IP) address of an access point accessed by the terminal;

setting, in response to the authentication information being determined valid in an authentication process of the authentication information, the terminal to be capable of performing the Push-to-Talk communications via the Web application; and determining, for the terminal set to be capable of executing the Push-to-Talk communications, whether or not the Push-to-Talk communications are permissible based on the authentication process of the authentication information.

9. A non-transitory computer readable medium including computer executable instructions, wherein the instructions, when executed by a processor, cause the processor to perform a method comprising:

obtaining, from a terminal, authentication information including a uniform resource locator (URL) for accessing the Web application, location information of the terminal, and an internet protocol (IP) address of an access point accessed by the terminal;

setting the terminal to be capable of performing the Push-to-Talk communications via the Web application if the authentication information is determined to be valid in an authentication process of the authentication information; and determining, for the terminal set to be capable of executing the Push-to-Talk communications, whether or not the Push-to-Talk communications are permissible based on the authentication process of the authentication information.

10. The non-transitory computer readable medium according to claim 9, wherein the method sets the terminal to be capable of executing the Push-to-Talk communications via the Web application if the location information indicates a location within a predetermined range.

11. The non-transitory computer readable medium according to claim 9, wherein the method sets the terminal to be capable of executing the Push-to-Talk communications via the Web application if the IP address is a predetermined address.

12. The non-transitory computer readable medium according to claim 9, wherein the authentication information is embedded in a one-dimensional code or a two-dimensional code.

13. The non-transitory computer readable medium according to claim 9, wherein the method executes the Push-to-Talk communications with the terminal if the Push-to-Talk communications are determined to be permissible for the terminal.

14. The non-transitory computer readable medium according to claim 9, wherein the Web application causes the terminal to display a display screen for one or more options including a content of an inquiry from a user of the terminal, and the method notifies, if information about one of the options specified by the user is obtained from the terminal, a talk group in the Push-to-Talk communications of a content corresponding to the specified option.

15. The non-transitory computer readable medium according to claim 9, wherein the Web application includes a display screen for one or more options including a content of an inquiry from a user of the terminal, and the method is further configured to update the content of the one or more options being displayed on the display screen by accepting a modification and an addition to the content.

* * * * *